UNITED STATES PATENT OFFICE.

HEINRICH JORDAN AND WILHELM NEELMEIER, OF LEVERKUSEN, NEAR COLOGNE, GERMANY, ASSIGNORS TO SYNTHETIC PATENTS CO. INC., OF NEW YORK, N. Y., A CORPORATION OF NEW YORK.

AZO COLORING-MATTERS.

1,147,803.  Specification of Letters Patent.  Patented July 27, 1915.

No Drawing.  Application filed July 7, 1914. Serial No. 849,587.

*To all whom it may concern:*

Be it known that we, HEINRICH JORDAN and WILHELM NEELMEIER, doctors of philosophy, chemists, citizens of the German Empire, residing at Leverkusen, near Cologne-on-the-Rhine, Germany, have invented new and useful Improvements in New Azo Coloring-Matters, of which the following is a specification.

We have found that new and valuable cotton dyes can be obtained by combining with aminoarylpyrazolones the diazo compounds obtainable from the aminobenzoylamino compounds described in United States Letters Patent Nos. 1059670 and 1012853. Yellow azo coloring matters are thus obtained. These colors are rendered fast to washing by aftertreatment with formaldehyde of fibers dyed with them. They can also be diazotized on the fiber and developed with suitable azo dyestuff components for instance with pyrazolones, shade fast to light and washing being obtained which can be discharged with hydrosulfite to a pure white.

In order to illustrate the new process more fully the following example is given, the parts being by weight:—64 parts of di-para-aminobenzoyl-para-aminophenylurea-disulfonic acid (see United States Letters Patent No. 1059670, line 69) having most probably the formula:

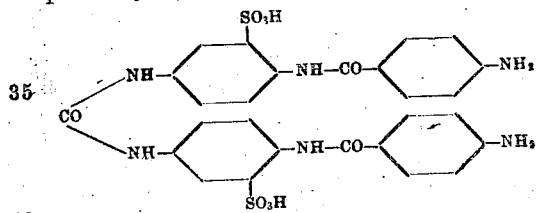

are dissolved in 1500 parts of hot water and 11 parts of sodium carbonate, the solution is acidulated with 80 parts of hydrochloric acid (19° Bé.) and diazotized at 0–5°C. with 13.8 parts of sodium nitrite. The diazo compound is added to an aqueous cooled solution of 37.8 parts of 1-meta-aminophenyl-3-methyl-5-pyrazolone and 70 parts of $Na_2CO_3$. The azodye is salted out. After being dried and pulverized it is a yellow powder dyeing cotton in bright greenish-yellow shades, which are rendered fast to washing by treatment with formaldehyde. An orange shade is obtained by diazotizing the dye on the fiber and developing it with beta-naphthol, a yellow shade by development with 1-phenyl-3-methyl-5-pyrazolone. Upon treatment with zinc powder and acetic acid it is split up into the di-para-aminobenzoyl-para-aminophenylurea-disulfonic acid and 1-meta-aminophenyl-3-methyl-4-amino-5-pyrazolone. A yellow dye is obtained from di-para-aminobenzoyl-para-aminobenzoyldiamino-stilben-disulfonic acid having most probably the formula:

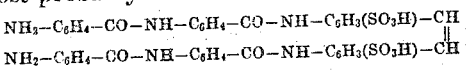

by combining it after diazotation with 1-meta-aminophenyl-3-methyl-5-pyrazolone. Other of the above mentioned products can be used.

We claim:—

1. The new dyes being derived from an aminobenzoylamino compound and an aminoarylpyrazolone being yellow azo colors, which are rendered fast to washing by aftertreatment with formaldehyde; yielding upon reduction an aminobenzoylamino-compound and a 4-aminopyrazolone and furnishing shades fast to washing and to light by diazotation on fiber and development with azo dyestuff components which shades can be discharged with hydrosulfite to a pure white, substantially as described.

2. The new dye being derived from di-para-aminobenzoyl-para-aminophenylurea-disulfonic acid and 1-meta-aminophenyl-3-methyl-5-pyrazolone, which is after being dried and pulverized a yellow powder dyeing cotton bright greenish-yellow shades which are rendered fast to washing by treatment with formaldehyde; an orange shade being obtained by diazotizing the dye on the fiber and developing it with beta-naphthol, a yellow shade by development with 1- phenyl-3-methyl-5-pyrazolone; and yielding upon treatment with zinc powder and acetic acid the di-para-aminobenzoyl-para-aminophenylurea-disulfonic acid and 1-meta-aminophenyl-3-methyl-4-amino-5-pyrazolone, substantially as described.

In testimony whereof we have hereunto set our hands in the presence of two subscribing witnesses.

HEINRICH JORDAN.
WILHELM NEELMEIER.

Witnesses:
 Louis Vandory,
 Hans Brückner.